Sept. 13, 1966   G. SHAPIRO ETAL   3,273,160
INDENTING RECORDER WITH ILLUMINATION MEANS
Filed May 15, 1964   2 Sheets-Sheet 1

INVENTORS
Gustave Shapiro
Robert O. Stone

BY Alvin J. Englert
AGENT

Sept. 13, 1966 G. SHAPIRO ET AL 3,273,160
INDENTING RECORDER WITH ILLUMINATION MEANS
Filed May 15, 1964 2 Sheets-Sheet 2

INVENTORS
Gustave Shapiro
Robert O. Stone

BY Alvin J. Engfert
AGENT

United States Patent Office 3,273,160
Patented Sept. 13, 1966

3,273,160
INDENTING RECORDER WITH ILLUMINATION MEANS
Gustave Shapiro, Silver Spring, and Robert O. Stone, Kensington, Md., assignors to the United States of America as represented by the Secretary of Commerce
Filed May 15, 1964, Ser. No. 367,908
1 Claim. (Cl. 346—77)

This invention relates to a recording apparatus, and more particularly to a recording apparatus adapted to be incorporated into small measuring instruments and the like to record a series of measurement points.

An object of this invention is to provide a recording apparatus in which the attainable density of recorded information is high.

Another object of this invention is to provide a recording apparatus in which the recorded information can be read without special reading equipment.

Another object is to provide a recording apparatus in which information is recorded in the form of dark marks on a light field.

A further object it to provide a recording apparatus which utilizes a record sheet that is durable and not easily torn or damaged.

A further object is to provide a recording apparatus in which the information is recorded by means of a simple, reliable, mechanical marker.

A still further object is to provide a recording apparatus in which the recorded marks are small, distinct, dark, and regularly-shaped.

A still further object is to provide a recording apparatus in which the record sheet is contained in a capsule or cartridge that is removable from the marking or recording mechanism, so that the recorded information may be stored and viewed remotely from the recording mechanism.

A yet further object is to provide a recording apparatus which is small, lightweight, rugged, economical, and easily incorporated into measuring instruments and the like.

In accordance with the present invention, an impressible, transparent record sheet is selectively positioned against a hard, rigid, translucent window. An indenting pin is disposed behind the record sheet, and is positioned within the area of the window in accordance with the measurement to be recorded. The pin is surrounded by an illuminating source which is adapted to illuminate the full area of the window at all positions of the pin. When the pin is properly positioned, it is actuated to indent the transparent record sheet, and is then withdrawn. Consequently, the indentation in the record sheet appears as a small, distinct, dark spot, while the pin is not readily discernible through the translucent window. In a preferred embodiment of the invention, the indenting pin and surrounding light source are adapted to be moved in co-ordinate directions with respect to a record cartridge containing the record sheet and translucent window.

Other objects, advantages and features of the present invention will be readily apparent when the following description is read in conjunction with the accompanying drawings, in which.

Figure 1:
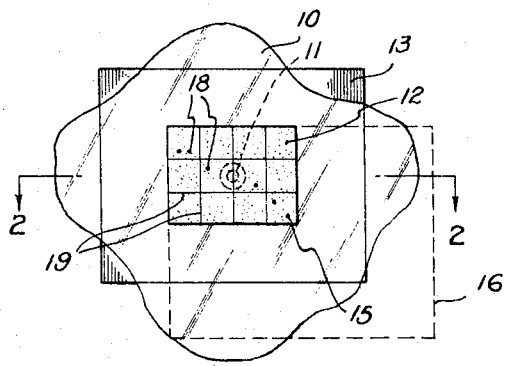
FIG. 1 is a front elevational view of a recording apparatus embodying the principles of the present invention.
Figure 2:
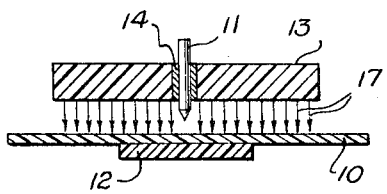
FIG. 2 is a plan sectional view taken on the line 2—2 of FIG. 1.

The recording apparatus illustrated in FIGS. 1 and 2 comprises a record sheet 10, an indenting pin 11, a window 12, and a light panel 13. The record sheet 10 is a thin, impressible, transparent sheet of plastic material such as photographic film carrier material or the like. The indenting pin 11 is adapted to be positioned relative to the record sheet 10 in accordance with a quantity to be recorded, and the pin position is recorded by axially moving the pin 11 to impress or indent the rear surface of the record sheet 10. The present invention is based on the finding that the resultant impressions or dents in record sheet 10 can be made to appear as small, distinct, dark dots against a light background when the record sheet is properly illuminated and displayed for viewing.

In accordance with the present invention, the dents in the rear surface of the record sheet 10 are displayed for viewing through the window 12. Window 12 is a hard, rigid plate of clear glass or plastic, the rear surface of which has been rendered translucent or diffusive, by grinding, etching or the like. The record sheet 10 is disposed directly against the diffusive rear surface of the window 12, so that any indicia on the record sheet are negligibly diffused when viewed through the window 12. The indenting pin 11, however, being normally spaced an appreciable distance from the diffusive rear surface of the window 12, normally is not discernible through the window 12. Thus, in the present invention, it is possible to maintain the indenting pin 11 near the record sheet 10 while the record sheet is viewed. It is not necessary, as in prior recorders, to move the pin away from the record sheet to view the recordings.

In further accordance with the present invention, the rear surface of record sheet 10 is illuminated by means of the light panel 13, which surrounds and moves with the indenting pin 11 as the pin is positioned relative to the record sheet 10 and window 12. The light panel 13 is a panel of electroluminescent, incandescent, or other light producing material, having a length and width substantially twice the length and width, respectively, of the window 12. Disposed through a transverse hole in the center of the light panel 13 is a bushing 14 for the indenting pin 11. By this arrangement, the indenting pin 11 can be positioned at any point of the area of record sheet 10 seen through the window 12, and the light panel 13 will completely fill the field of view through window 12. For example, as shown in FIG. 1, when the indenting pin 11 is positioned at the lower right-hand corner of window 12 (the position of dot 15), the light panel 13 assumes the position indicated by dotted line 16, wherein the upper left-hand quarter of the light panel is behind the window 12.

Since each point on the front surface of the light panel 13 emits light in all directions, each point of the record sheet 10 behind the window 12 receives a light ray 17, FIG. 2, that is perpendicular thereto. It has been found that this condition, wherein each dent in the record sheet 10 receives light having components substantially normal to the record sheet, causes the dents to appear as small, distinct, dark dots 18 through the window 12.

The dots 18 are substantially black against a bright background and hence are very readable. Because the dots 18 are formed by impressing (as opposed to puncturing or inking) the record sheet 10, they are of uniform, circular outline, and are not easily confused with dust particles or nicks in the record sheet. Being highly uniform, the dots 18 can be closely spaced and still distinguished, allowing a high density of information to be recorded on a unit area of the record sheet 10.

To aid in identifying the positions of the dots 18 seen through the window 12, the window 12 may be provided with any suitable grid lines 19, FIG. 1, painted, etched, or otherwise disposed on the front or rear surfaces thereof. Similarly, the record sheet 10 or a frame therefor (not shown) may be provided with any suitable indexing or referencing indicia (not shown) as is desired.

From the foregoing, it will be seen that the recording apparatus illustrated in FIGS. 1 and 2 provides an extremely simple, rugged, compact, lightweight and inexpensive recorder which can easily be incorporated into a measuring instrument or the like.

Figure 3:
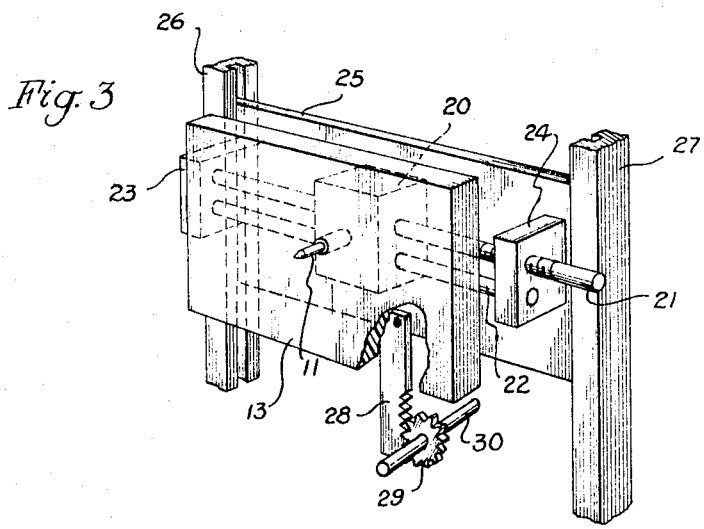
FIG. 3 is a perspective view of a preferred carriage mechanism for translating the indenting pin and light source in co-ordinate directions.
Figure 4:
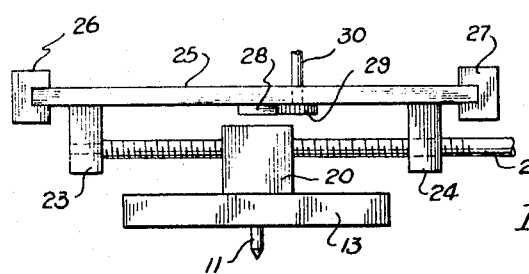
FIG. 4 is a top plan view of the carriage mechanism shown in FIG. 3.

In a preferred embodiment of the present invention, the indenting pin 11 and surrounding light panel 13 are moved in orthogonal directions relative to the record sheet 10 by means of the carriage mechanism shown in FIGS. 3 and 4. In FIGS. 3 and 4, the indenting pin 11 comprises the armature of a solenoid 20, and the light panel 13 is attached in any suitable manner to the front surface of the solenoid 20. Solenoid 20 is transversely threaded to receive a horizontal carriage screw 21, and is bored to receive a parallel guide rod 22. The carriage screw 21 is journalled, and the parallel guide rod 22 is fastened, in a pair of blocks 23, 24 that project forwardly from a vertical carriage plate 25. The vertical carriage plate 25 slides in a pair of vertical channels 26, 27. Attached to the lower edge of the vertical carriage plate 25 is a vertical rack 28 which is engaged by a pinion gear 29 fastened to a shaft 30. Thus, the indenting pin 11 and surrounding light panel 13 can be positioned in the horizontal and vertical directions by rotating the horizontal carriage screw 21 and the pinion gear shaft 30, respectively. The rotation of the screw 21 and shaft 30 may be effected in any convenient manner, either manually, or by motor means.

Figure 5:
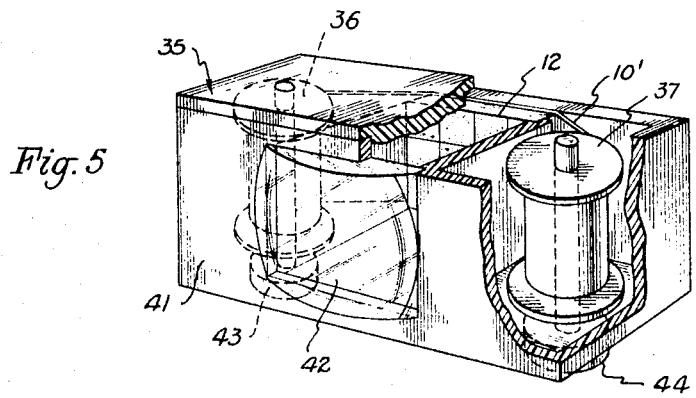
FIG. 5 is a perspective view of a preferred record cartridge for housing the record sheet and translucent window, a portion of the front wall of the cartridge being broken to show the record sheet and window.
Figure 6:
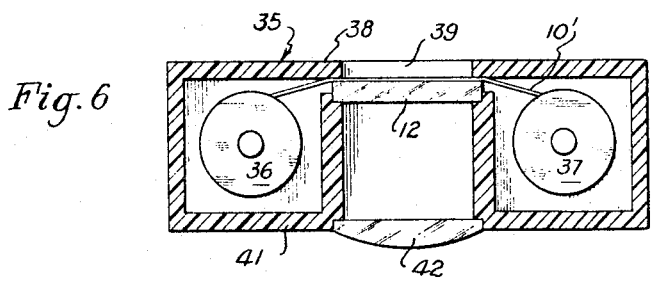
FIG. 6 is a top plan view of the record cartridge of FIG. 5, as seen when the top cover is removed.

FIGS. 5 and 6 illustrate a preferred mechanism, comprising a record cartridge 35, for selectively positioning the record sheet 10 behind the window 12. In FIGS. 5 and 6, the record sheet is in the form of a long band or strip 10' wound onto a pair of spools 36, 37 journalled in the ends of the record cartridge 35. The record sheet 10' is threaded between the window 12 and the back wall 38 of the record cartridge 35, back wall 38 having an opening 39 to expose the record sheet 10' to the indenting pin and light panel. Disposed in the front wall 41 of the record cartridge 35 is a small magnifying lens 42 which aids in viewing the window 12. Suitable means such as knobs 43, 44 are attached to the spools 36, 37 to position selected frames of the record sheet 10' behind the window 12. The record sheet 10' may be provided with marks, holes, notches or the like to co-operate with indexing or registration mechanisms (not shown) disposed in the record cartridge 35.

From the foregoing, it will be seen that the record cartridge 35 provides a convenient means for storing, positioning, and viewing the records contained on record sheet 10'. To view the records, the record cartridge 35 may be positioned so that the opening 39 in the back wall 38 is adjacent the light panel 13; or, the record cartridge may be hand-held so that the back wall 38 is perpendicular to a distant bright light source, whereby every point of the record sheet 10' exposed through the opening 39 receives light rays having components substantially perpendicular thereto, causing the dents in the record sheet 10' to appear as distinct dark dots 18.

Figure 7:
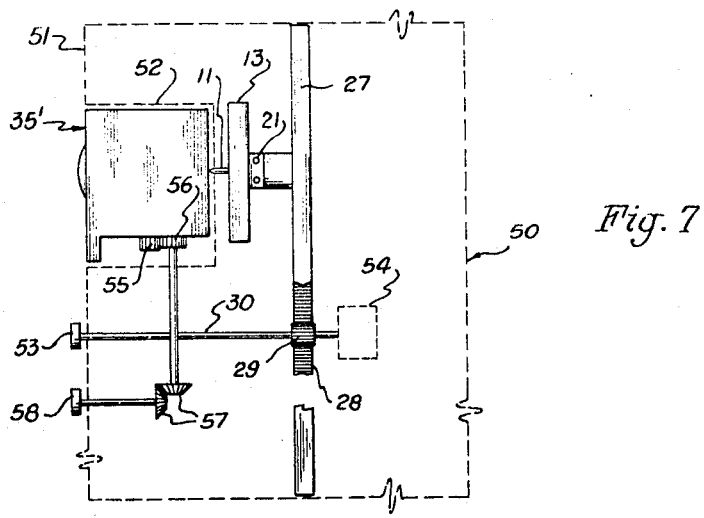
FIG. 7 is a side elevational view of the carriage mechanism of FIGS. 3 and 4 and the record cartridge of FIGS. 5 and 6 disposed in a typical measuring instrument.

In FIG. 7 there is illustrated an exemplary manner in which the recording apparatus of the present invention may be incorporated into a measuring instrument 50 or the like. The front wall 51 of the instrument 50 is provided with a well 52 into which the record cartridge 35' is inserted. The end of the well 52 has an opening that faces the indenting pin 11 and the light panel 13, these elements 11 and 13 being supported by the vertical channels 26 (not shown) and 27. The pinion gear shaft 30 for vertically positioning the indenting pin 11 and light panel 13 extends through the front wall 51 and is provided with a knob 53. In addition, the shaft 30 may engage any rotatable member 54, such as a potentiometer, the angular position of which contains the intelligence to be recorded, whereby the vertical position of the indenting pin 11 represents the setting or intelligence of the rotatable member 54. The horizontal carriage screw 21 may be extended through a vertical slot in the side wall (not shown) of the instrument 50, or otherwise adapted to be rotated by the operator of the instrument; and in addition, may be linked to any rotatable member as desired, to have the horizontal position of the indenting pin 11 represent the setting or angular position thereof.

To position the strip of record sheet 10' in the record cartridge 35', the pair of spools therein may be provided with a pair of gears such as the gear 55, engaged by a gear 56 connected by a right-angle drive 57 to a knob 58 on the front wall 51 of the instrument 50. Alternatively, the spools may be engaged in any convenient manner by motor means adapted to be controlled by the instrument operator, or by the record sheet, in any of the well known manners for advancing web or film materials.

From the foregoing it will be seen that the recording apparatus of the present invention may easily be incorporated into a variety of devices to record a series of points. Since the indenting and illuminating mechanisms which are mounted in the device are compact and lightweight, the device readily retains any portable features thereof. In addition, since the record cartridge is removable from the device having the indenting mechanism, the records may be stored with the apparatus whose behaviour is recorded thereon, making the records available for quick future reference. The records may be viewed from the cartridge (as explained above) without the use of special reading equipment, whereby the recording apparatus can find wide, economical use. The records are permanent and yet inexpensive, and can readily be duplicated by existing photographic processes.

The present invention has been illustrated by specific embodiments, many variations and modifications of which will be apparent to those skilled in the art. It is therefore intended that the present invention include all such variations and modifications as fall within the scope and range of equivalency of the appended claim.

What is claimed is:

A recording apparatus comprising:

a hard, rigid, translucent window, a thin, impressible, transparent record sheet, means for positioning a selected portion of said record sheet firmly against the rear surface of said window, an indenting pin, means for positioning said indenting pin adjacent the exposed surface of said record sheet at a selected point within the area of said window, means for selectively pressing the point of said indenting pin into said record sheet to form a small dent in said sheet at said selected point, said record sheet being supported by said window, and a light panel disposed about said indenting pin and parallel to said window, said light panel having a length and width substantially at least twice the length and width, respectively, of said window, said indenting pin extending centrally of said light panel, whereby all points of said portion of said record sheet disposed against said window are illuminated with light rays normal thereto at any selected position of said indenting pin, causing the dents in said record sheet to appear as distinct dark dots in a bright field, and whereby said indenting pin in the non-operated position adjacent said record sheet is not visible through said translucent window.

References Cited by the Examiner

UNITED STATES PATENTS

| | | | |
|---|---|---|---|
| 2,012,736 | 8/1935 | Taylor | 346—146 |
| 2,141,964 | 12/1938 | Yonkers | 346—77 X |
| 2,665,187 | 1/1954 | Kinley et al. | 346—77 X |
| 2,859,659 | 11/1958 | Fenske et al. | 88—24 |
| 2,918,343 | 12/1959 | Guillot | 346—8 |
| 3,151,927 | 10/1964 | Angst et al. | 346—29 X |

RICHARD B. WILKINSON, *Primary Examiner.*

LOUIS J. CAPOZI, *Examiner.*

JOSEPH W. HARTARY, *Assistant Examiner.*